June 5, 1956 — R. H. GOODRICH — 2,749,102
AUGER DRILL HEAD
Filed Oct. 14, 1952 — 2 Sheets-Sheet 1

INVENTOR:
Ross H. Goodrich

BY Ross A. Maxson
ATTORNEY

June 5, 1956 — R. H. GOODRICH — 2,749,102
AUGER DRILL HEAD
Filed Oct. 14, 1952 — 2 Sheets-Sheet 2

INVENTOR:
Ross H. Goodrich
BY
ATTORNEY

United States Patent Office 2,749,102
Patented June 5, 1956

2,749,102
AUGER DRILL HEAD

Ross H. Goodrich, Claremont, N. H., assignor to Joy Manufacturing Company, Pittsburgh, Pa., a corporation of Pennsylvania Application October 14, 1952, Serial No. 314,591

5 Claims. (Cl. 262—9)

This invention relates to auger drill heads, and particularly to large auger drill heads which are adapted to be arranged at the forward end of driving and helical conveying means for the purpose of forming relatively large openings in mineral veins, either for the purpose of forming tunnels or bores, or for mining material which because of the thinness of the seams is best mined by such devices.

Auger drill heads comprising a rotatable and advanceable head in the form of a relatively long cylinder armed with cutters at its forward end and having coaxial with it, and of smaller overall diameter than the inside diameter of such cylinder, a breaker, such cylinder and breaker arranged at the forward end of a driving and conveying screw, is known to the art. The cylinders of these auger drill heads are relatively long and the space between the cylinder and the breaker frequently becomes choked with material. They are, moreover, heavy.

The use of a ring to support cutting elements provides for a larger number and a more widespread distribution of such elements than is practicable by an arrangement of cutting elements only on the ends of two or more arms extending forwardly from in adjacency to the helical conveyor. The use of arms extending between a base or support fixable to the forward end of the conveyor, said arms circumferentially spaced and desirably helically disposed, provides for lightness and for more certain transfer of material to the conveyor helix from the ring. The use of a ring and arms moreover provides a more rigid structure than would be possible with the use of spaced arms alone.

A desirable embodiment of the invention may comprise a ring of appropriate diameter and suitable radial thickness and of comparatively short axial dimension, said ring armed with a number of cutting bits preferably more or less uniformly spaced about its circumference and in an arrangement which cuts a circular groove into which the ring may be advanced. The ring may be supported by two or more arms which extend from the ring to a suitable base which may be provided with a spud portion for reception in a socket at the forward end of a helical conveyor and drive element. Preferably the arms will be helically disposed and spaced circumferentially from each other. They may be spiral segments cut from a cylinder of approximately the diameter of the supporting ring. If the radial thickness of these arms is small, they may desirably be provided on their leading edges with flightlike flanges or projections, projecting towards the axis of the auger head, to increase their areas of contact with broken material and aid in moving the latter towards the helical conveyor. The base or support to which the arms are conected at their ends remote from the ring may comprise in addition to the spud a central body carrying at its forward end the breaker, and a plurality of radially extending arms, one for each preferably helical arm extending foward to the ring. The axes of these radially extending arms may be in planes at right angles to the axis of auger head rotation but will preferably be skewed to conform to the helix of the ring supporting arms to promote the delivery of material between the radial arms to the helical conveyor. As a breaker there may be used a frusto-conical projection from the base or support, provided with spiral flutes providing spaces between them for material drilled out by a set of pilot hole-cutting bits supported by the breaker and which are adapted to cut a hole of adequate diameter to admit the small end of the conical breaker. The breaker may be disposed with its forward end forward of, rearward of, or in the same transverse planes as the front of the ring. It will be appreciated that as such an auger drill head is rotated and advanced the bits on the ring will cut an annular kerf, the pilot hole-cutting bits cut a coaxial bore, and the breaker expands and breaks the annular core of material between the central hole and the annular kerf, and the helical arms will move—plow—the broken material along the wall of the bore of the hole and cause it to pass between the radially extending arms which support the helical arms and so into the field of action of the helical conveyor.

An object of my invention is to provide an improved auger drill head. Another object of the invention is to provide an improved auger drill head which is comparatively light, possesses the necessary strength and rigidity, and is adapted to insure in an improved manner the avoidance of clogging of the drill head. Other objects and advantages will hereinafter appear.

In the accompanying drawings, in which one illustrative embodiment of the invention is shown, Fig. 1 is a side elevational view of an illustrative embodiment of my improved auger drill head.

Figure 1:
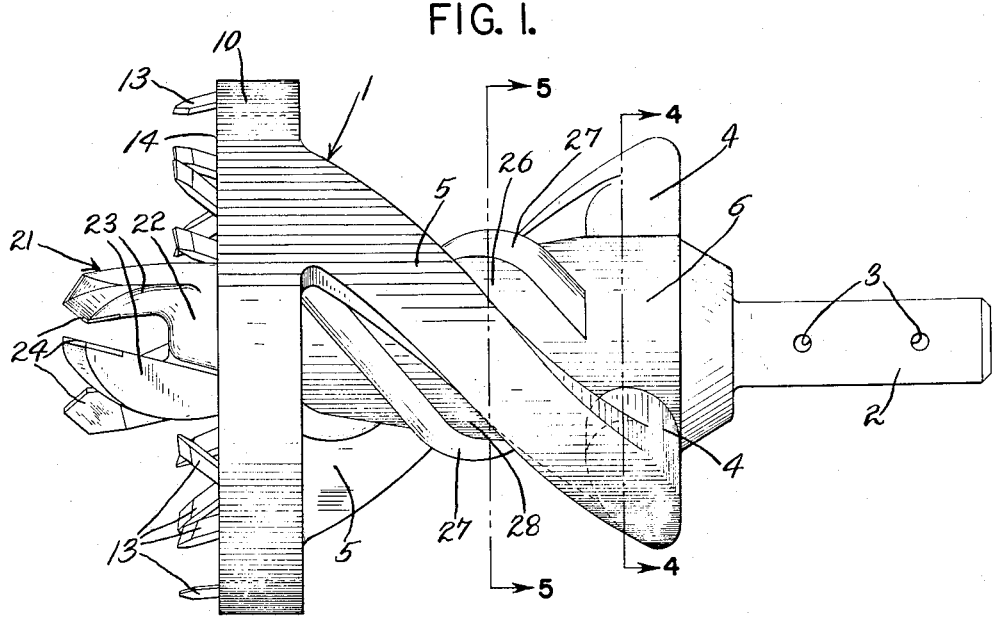
Figure 4:
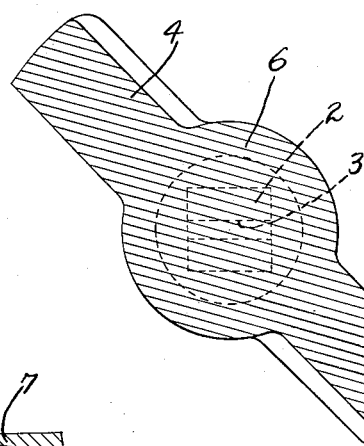
Figure 5:
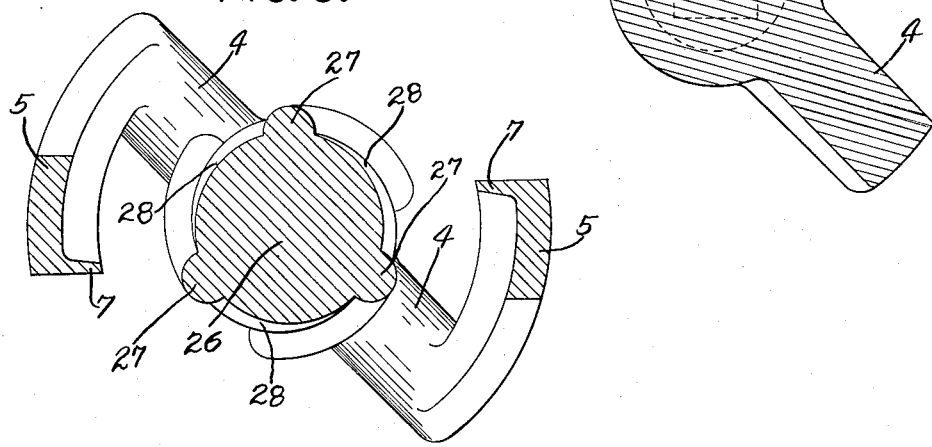

Figs. 4 and 5 are transverse sections respectively on the planes of the lines 4—4 and 5—5 of Fig. 1.

Figure 2:
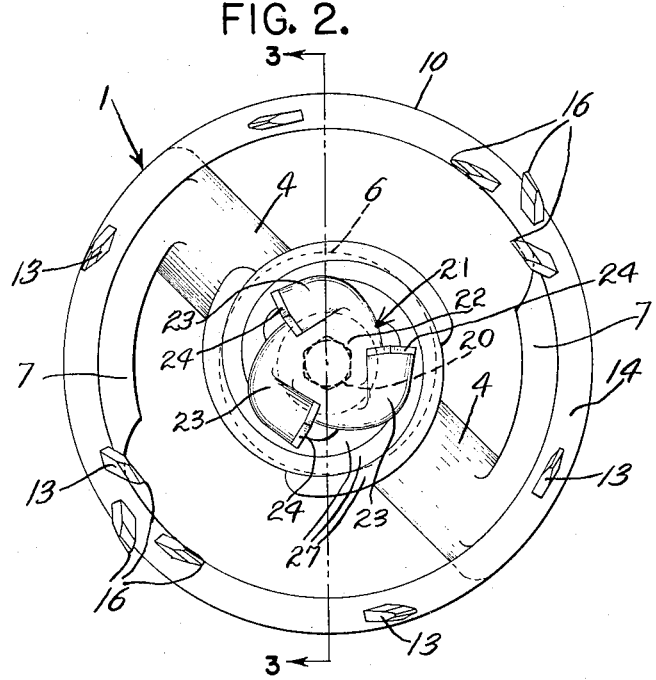
Fig. 2 is a front end view of the auger drill head of Fig. 1.
Figure 3:
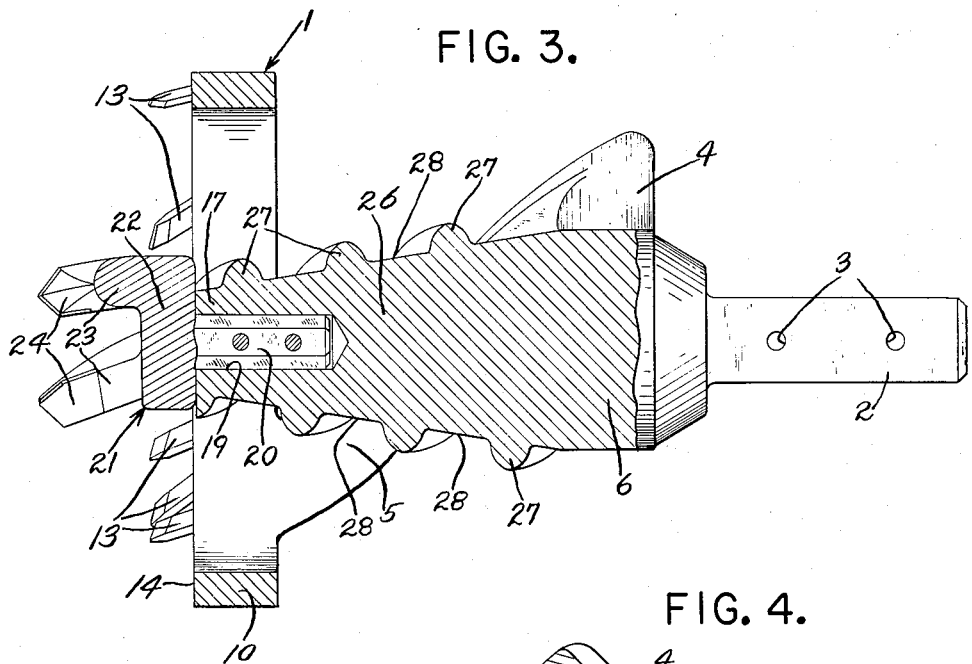
Fig. 3 is a view partly in side elevation and partly in section on the plane of the line 3—3 of Fig. 2.

Referring to the drawings, wherein a drill head is shown at 1, this drill head is adapted to be mounted at the forward end of usual drive shaft (not shown) with which is associated a conveyor helix (also not shown), the auger head having, as shown in Figs. 1, 3 and 4, a square spud portion 2 which is adapted to enter a correspondingly shaped socket in the drive shaft and to be held in the socket by one or more cross pins extending through transverse openings 3. The auger drill head as shown comprises a plurality of radially extending arms 4, 4, herein two being shown. These carry at their outer ends helically disposed forwardly extending arms 5, 5, each arm 4 carrying an arm 5. The arms 4, 4 are formed, as shown, integrally with a hub portion 6 from which the spud 2 projects. Obviously wide arcuate spaces exist between arms 4, 4 and outside of the hub 6 when the auger drill head is located in a bore which it is in the process of forming. If the arms 5, 5 are relatively thin they may desirably be provided at their leading edges with radially inwardly extending flanges 7, conforming to the curvature of the arms and of such radial dimension as to improve the pushing action of the arms on the broken material in the bore. The arms 5, 5 at their forward ends are connected by a ring 10, the outside of the ring and the outer surface of the arms lying, as illustrated, in a common cylindrical surface. The ring 10 is provided at its forward end with mineral-attacking elements 13, shown as cutter bits, which may be arranged in any desired pattern about the forward face 14 of the ring 10. As may be seen from Fig. 2, even with the pattern of material-attacking elements shown in that figure, which pattern consists of bits located at six points circumferentially spaced about the forward end of the ring, a plurality of bits being arranged, as at 16 and 16, so as to cut respectively inside and outside the circular walls of the ring so as to provide clearance and the inwardly and outwardly projecting bits being located near each other at each of the points 16, and the points 16 being located diametrically opposite each other for the purpose of improving smoothness of operation.

The hub 6 tapers forwardly, as best shown in Figs. 1 and 3, and at its forward end 17 it is provided with a socket 19 in which there is receivable a spud portion 20 which carries a drill 21 from the base 22 of which there projects arms 23 formed with bit portions 24 at their forward ends so as to drill a central opening coaxially with the ring 10. The taper of the hub 6 (the tapered portion is indicated at 26) is such that the forward end of the tapered hub may enter the hole drilled by the bit portions 24, and the tapered portion 26 of the hub is provided on its periphery with a continuous helical projection or rib 27, between successive turns of which there are grooves 28 and the width and depth of the grooves are such that all of the material cut away by the drilling head can pass through the grooves even if the hub portion 26 and the forward ends of the projection 27 enter the hole bored by the drill for a substantial distance.

It will be understood that the projection or rib 27 is arranged as a helix of increasing radius, from the forward end of the hub 6 back to the full diameter portion of the hub 6. The arms 4 are desirably skewed so that their surfaces may aid in the movement of material broken up by the auger drill head back to the conveyor at whose forward end such drill head is located. The forwardmost end of the rib 27 can also enter the central hole.

It will be understood that as the drill head 1 is rotated, the mineral-attacking elements 13 mounted on the ring 10 will cut an annular opening or groove and that the drill 21 will form a central circular opening coaxial with the annular opening. As the auger is advanced the forward end of the helically disposed projection or rib 27 will enter the central hole and will break the material between the central hole and the annular groove outwardly, breaking the annulus of material up sufficiently thoroughly so that as the auger continues to advance the material will be pushed by the leading surfaces of the helical arms 5 and the flanges 7, when provided, backwardly in the hole and between the radial arms 4 whence it will enter the helical conveyor at whose forward end the auger drill head is arranged. It will be understood that the flanges 7 do not extend, in an auger drill head of the proportions shown, forwardly along the arms 5 completely up to the ring 10. Thus they do not interfere with the entrance of the forward ends of the arms 5 for a distance into the annular groove which the auger forms, but are available to aid in pushing the broken material outward as soon as it has been broken up.

The construction described provides for smooth operation, minimizes vibration of the arms 5 as compared with constructions in which the arms have no forward ring with which they are connected, and utilizes the arms very effectively for pushing the material rearwardly in the bore and getting it past the radial arms 4; and, because of the short axial length of the ring there is no possibility of the ring being plugged, with resultant interruption of transport of material, while because of the helical disposition of the arms 5 and the flange portions 7, the material is unable to become stalled between the ring and the helical conveyor.

From the foregoing description, it will be clear that my invention is adapted to provide for rapid and efficient formation of a hole of substantial size and for the removal of material as rapidly as it is detached from the solid— both the material drilled away and the material of the annular core between the central hole and the annular groove—without any possibility of plugging of the device, because there is assured relative rotation between the auger drill head and the surface contacted by the material at all times when the drilling operation is in progress.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim is:

1. A rotatable auger drill head comprising a hub, a plurality of radial arms extending outwardly from said hub, a plurality of helically disposed arms one carried by each of said radial arms and extending forwardly therefrom, a ring carried solely by and connecting the forward ends of said helically disposed arms, mineral attacking means carried by said ring for cutting an annular groove, said ring receivable in such groove and said helically disposed arms having their outer surfaces spaced from the axis of rotation of said auger drill head a radial distance less than one-half the outside diameter of such groove but lying throughout their lengths close to the surface of a bore of the peripheral wall of which the outer wall of said annular groove constitutes an extension, and means at the forward end of said hub for forming a central opening coaxial with said groove and breaking the material between said opening and groove.

2. A rotatable auger drill head comprising a hub, a plurality of radial arms extending outwardly from said hub, a plurality of helically disposed arms one carried by each of said radial arms and extending forwardly therefrom and having their outer surfaces substantially uniformly spaced from a straight line in which the axis of rotation of said drill head lies, a ring carried solely by and connecting the forward ends of said helically disposed arms, mineral attacking means carried by said ring for cutting an annular groove, said ring and at least the forward ends of said arms receivable in such groove, and means at the forward end of said hub for forming a central opening coaxial with said groove and breaking the material between said opening and groove.

3. A rotatable auger drill head adapted for attachment to and rotation by a helical conveyor line, said auger drill head including at the forward end thereof a ring, material-attacking elements carried by said ring for forming an annular groove in which said ring is receivable, drilling and breaking means coaxial with said ring, and means extending between said ring and the helical conveyor line for supporting said ring and for moving the material detached and disintegrated by said auger drill head along the wall of the hole formed by the extension of the outer wall of the annular groove, including a plurality of helically disposed, spaced arms having their outer surfaces conforming in dimension and shape substantially to the curvature of the outer wall of said groove and having at their forward faces, in terms of direction of rotation, inwardly extending flanges for pushing detached and disintegrated material along the wall of the hole.

4. A rotatable auger drill head adapted for attachment to and rotation by a helical conveyor line, said auger drill head including at the forward end thereof a ring, material-attacking elements carried by said ring for forming an annular groove in which said ring is receivable, drilling and breaking means coaxial with said ring, and means between said ring and the helical conveyor line for supporting the ring and for moving the material detached and disintegrated by said auger drill head along the wall of the hole formed by the extension of the outer wall of the annular groove including a plurality of helically disposed spaced arms having their outer surfaces conforming substantially in shape and dimension to the curvature of the outer wall of said groove and of a radial thickness at their forward ends less than the radial dimension of said groove and positioned radially to enter said groove, and rearwardly of their forward ends and of said ring having radially thicker portions providing increased areas for engaging and pushing detached and disintegrated material along the wall of the hole.

5. A rotatable auger drill head adapted for attachment to and rotation by a helical conveyor line, said auger drill head including at the forward end thereof a ring, material-attacking elements carried by said ring for forming an annular groove in which said ring is receivable, drilling and breaking means coaxial with said ring, and means between said ring and the helical conveyor line for supporting the ring and for moving the material detached and disintegrated by said auger drill head along the wall of the hole formed by the extension of the outer wall of the annular groove including a plurality of helically disposed spaced arms having their outer surfaces conforming substantially in shape and dimension to the curvature of the outer wall of said groove and of a radial thickness at their forward ends less than the radial dimension of said groove and positioned to enter said groove, and rearwardly of their forward ends, and at their forward sides in terms of the direction of rotation of said auger drill head, having portions which are thicker radially and provide increased areas for pushing detached and disintegrated material along the wall of the hole.

References Cited in the file of this patent

UNITED STATES PATENTS

| | | |
|---|---|---|
| 632,764 | Stephens | Sept. 12, 1899 |
| 1,445,085 | Joy | Feb. 13, 1923 |
| 2,562,841 | Compton | July 31, 1951 |
| 2,575,975 | Robbins | Nov. 20, 1951 |
| 2,594,256 | Compton | Apr. 22, 1952 |

FOREIGN PATENTS

| | | |
|---|---|---|
| 812,906 | Germany | Sept. 6, 1951 |
| 120,935 | Great Britain | Dec. 5, 1918 |
| 162 of 1868 | Great Britain | Jan. 17, 1868 |